(12) United States Patent
Crue, Jr. et al.

(10) Patent No.: US 6,466,404 B1
(45) Date of Patent: Oct. 15, 2002

(54) MAGNETIC READ/WRITE DEVICE WITH INSULATED COIL LAYER RECESSED INTO POLE

(75) Inventors: Billy W. Crue, Jr., San Jose; Renuka Apparao, Fremont; Zhupei Shi, San Jose; Ken Young, Sunnyvale; Mark Seymour, Morgan Hill, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/994,436

(22) Filed: Nov. 26, 2001

Related U.S. Application Data

(62) Division of application No. 09/311,939, filed on May 14, 1999, now Pat. No. 6,349,014.

(51) Int. Cl.[7] .............................................. G11B 5/147
(52) U.S. Cl. .................................................... 360/126
(58) Field of Search .................................. 360/126, 123

(56) References Cited

U.S. PATENT DOCUMENTS

| | | |
|---|---|---|
| 4,860,140 A | 8/1989 | Momata |
| 5,465,475 A | 11/1995 | Kinoshita |
| 6,130,809 A | 10/2000 | Santini |
| 6,191,918 B1 * | 2/2001 | Clarke ........................ 360/126 |

* cited by examiner

*Primary Examiner*—A. J. Heinz
(74) *Attorney, Agent, or Firm*—Carr & Ferrell LLP

(57) ABSTRACT

A write element for recording data on a magnetic medium includes a first pole and a second pole separated by a non-magnetic, electrically insulating write gap layer. In addition, a coil layer is recessed into the first pole and is electrically insulated from the first pole by a coil insulation layer, and form the second pole by a coil separation layer. The coil layer includes at least one coil turn, each of which are transversely separated from an adjacent coil turn by a coil turn divider. In some embodiments, the coil turn dividers are integral with and therefore formed of the same material as the first pole. The coil layer, first pole, and coil turn dividers are planarized before formation of the coil separation layer. Also, a second pole pedestal can be connected to the second pole at the air bearing surface, and separated from the first pole by the write gap layer. A highly heat conductive material can be disposed below the first pole as an undercoat. Such an undercoat can facilitate dispersion of heat that is generated by a current passing through the coil layer, away from other components of the write element. In addition, the write element can be formed in conjunction with a read element to form a read/write head. The read element can be formed above the write element, with the coil layer embedded in the first pole which is distal the read element.

27 Claims, 17 Drawing Sheets

MAGNETIC READ/WRITE DEVICE WITH INSULATED COIL LAYER RECESSED INTO POLE

This application is a divisional of U.S. application Ser. No. 09/311,939 filed on May 14, 1999, now U.S. Pat. No. 6,349,014 and claims priority therefrom pursuant to 35 U.S.C. §120.

BACKGROUND OF THE INVENTION

This invention relates generally to magnetic data storage systems, more particularly to magnetoresistive read heads, and most particularly to structures incorporating an insulating barrier, as well as methods for making the same.

Magnetic disk drives are used to store and retrieve data for digital electronic apparatuses such as computers. In FIGS. 1A and 1B, a magnetic disk data storage system 10 includes a sealed enclosure 12, a disk drive motor 14, and a magnetic disk, or media, 16 supported for rotation by a drive spindle S1 of motor 14. Also included are an actuator 18 and an arm 20 attached to an actuator spindle S2 of actuator 18. A suspension 22 is coupled at one end to the arm 20, and at its other end to a read/write head or transducer 24. The transducer 24 typically includes an inductive write element with a sensor read element (which will be described in greater detail with reference to FIG. 2A). As the motor 14 rotates the magnetic disk 16, as indicated by the arrow R, an air bearing is formed under the transducer 24 causing it to lift slightly off of the surface of the magnetic disk 16, or, as it is sometimes termed in the art, to "fly" above, the magnetic disk 16. Alternatively, some transducers, known as "contact heads," ride on the disk surface. Data bits can be read along a magnetic "track" as the magnetic disk 16 rotates. Also, information from various tracks can be read from the magnetic disk 16 as the actuator 18 causes the transducer 24 to pivot in an arc as indicated by the arrows P. The design and manufacture of magnetic disk data storage systems is well known to those skilled in the art.

FIG. 2A depicts a magnetic read/write head 24 including a substrate 25 above which a read element 26 and a write element 28 are disposed. Edges of the read element 26 and write element 28 also define an air bearing surface ABS, in a plane 29, which can be aligned to face the surface of the magnetic disk 16 (see FIGS. 1A and 1B). The read element 26 includes a first shield 30, an intermediate layer 32, which functions as a second shield, and a read sensor 34 that is located within a dielectric medium 35 between the first shield 30 and the second shield 32. The most common type of read sensor 34 used in the read/write head 24 is the magnetoresistive (AMR or GMR) sensor which is used to detect magnetic field signals from a magnetic medium through changing resistance in the read sensor.

The write element 28 is typically an inductive write element which includes a first pole 38 and the intermediate layer 32, which functions as a second pole. A second pole pedestal 42 is connected to a second pole tip portion 45 of the second pole. The first pole 38 and the second pole 32 are attached to each other by a backgap portion 40, with these three elements collectively forming a yoke 41 with the second pole pedestal 42. The area around the first pole tip portion 43 and a second pole tip portion 45 near the ABS is sometimes referred to as the yoke tip region 46. A write gap 36 is formed between the first pole 38 and the second pole pedestal 42 in the yoke tip region 46. The write gap 36 is filled with a non-magnetic electrically insulating material that forms a write gap material layer 37. This non-magnetic material can be either integral with (as is shown here) or separate from a first insulation layer 47 that lies between the first pole 38 and the second pole 32, and extends from the yoke tip region 46 to the backgap portion 40.

Also included in write element 28 is a conductive coil layer 48, formed of multiple winds 49. The conductive coil 48 is positioned within a coil insulation layer 50 that lies below the first insulation layer 47. The first insulation layer 47 thereby electrically insulates the coil layer 48 from the second pole 32, while the coil insulation layer 50 electrically insulates the winds 49 from each other and from the second pole 38. In some prior art fabrication methods, the formation of the coil insulation layer includes a thermal curing of an electrically insulating material, such as photoresistive material. However, when this process is performed after the formation of the read sensor, the magnetic properties of the read sensor can be permanently and undesirably altered. Thus, the formation of the coil layer 48 and the coil insulation layer 50 before formation of the read sensor can help to avoid such damage to the read sensor during fabrication.

More specifically, an inductive write head such as that shown in FIG. 2A operates by passing a writing current through the conductive coil layer 48. Because of the magnetic properties of the yoke 41, a magnetic flux can be induced in the first and second poles 38, 32 by a write current passed through the coil layer 48. The write gap 36 allows the magnetic flux to fringe out from the yoke 41 (thus forming a fringing gap field) and to cross a magnetic recording medium that is placed near the ABS.

As a current is passed through, the coil layer 48 can increase in temperature. Heat can then transfer to other components of the read/write head 24, for example the read sensor 34. With sufficiently high heating of the read sensor 34, the magnetic properties of the read sensor 34 can undesirably change, thereby adversely affecting the read capabilities during such heating. Further, this heating can thermally damage the read sensor 34, including undesirably permanently altering the read capabilities of the read sensor.

A critical parameter of a magnetic write element is a trackwidth of the write element, which defines track density. For example, a narrower trackwidth can result in a higher magnetic recording density. The trackwidth is defined by geometries in the yoke tip portion 46 at the ABS. These geometries can be better understood with reference to FIG. 2B. As can be seen from this view, the first and second poles 38, 32 can be wider in the yoke tip portion 46 (see FIG. 2A) than the second pole pedestal 42. In the shown configuration, the trackwidth of the write element 28 is defined by the width WP2P of the second pole pedestal 42. However, control of the second pole pedestal width WP2P can be limited by typical fabrication processes. More specifically, these dimensions can be difficult to control when the second pole pedestal 42 is formed over a substantially non-planar topography that includes the elements that were formed before the second pole pedestal 42. For example, the definition of the second pole pedestal width WP2P, for example including photoresistive material ("photoresist") deposition and etching, can be decreasingly reliable and precise with increasing topography. When demand for higher density writing capabilities drives smaller trackwidths, this aspect of fabrication becomes increasingly problematic. For example, the width WP2P can be limited to a minimum of about 0.4 microns for 35 Gb/in$^2$ magnetic recording.

Thus, what is desired is a write element that is magnetically and thermally more efficient, and that has minimal adverse impact on a read sensor when combined with a read element to form a read/write head. Further, it is desired that fabrication of such a write element and read/write head be inexpensive, quick, and simple.

SUMMARY OF THE INVENTION present invention provides a magnetic recording device and method for making the same that provides high recording performance. More specifically, a write element having high thermal and magnetic efficiency is provided.

In an embodiment of the present invention a device for exchanging data with a magnetic medium includes a substrate and a first pole formed of ferromagnetic material and disposed above the substrate. A second pole formed of ferromagnetic material is disposed above the substrate. The first and second pole each have an edge that forms an air bearing surface. The device also includes a coil layer that is recessed into the first pole and a write gap layer formed of non-magnetic, electrically insulating material. The write gap layer is disposed between the first pole and the second pole, and the write gap layer has an edge that forms the air bearing surface. The device further includes a coil separation layer formed of non-magnetic, electrically insulating material and disposed between the coil layer and the second pole. The substrate can include a material having a high thermal conductivity such as aluminum nitride (AlN) or silicon nitride ($Si_3N_4$). In additional aspects of the present invention, such a device can be further incorporated with other components to form a read/write slider, a head gimbal assembly (HGA), a disk drive system, or any combination or permutation thereof. For example, the device can be connected with a read element that includes a read sensor, to form a read/write head.

In another embodiment of the present invention, a method of forming a device for exchanging data with a medium includes providing a substrate and forming a first pole above the substrate. The method also includes forming a coil layer that is recessed into the first pole. This includes forming a plurality of coil turns that are electrically connected to each other in series in a longitudinal direction, and electrically insulating the coil turns from each other in a transverse direction. In addition, the coil layer is formed to carry a current along a length of each turn to a next turn in series, and electrically insulated to substantially avoid passing a current transversely between turns. The method further includes electrically insulating the coil layer from the first pole and forming a second pole above the first pole and above the coil layer. Also, electrically insulating said coil layer from said second pole and electrically and magnetically insulating a first pole tip region of the first pole from a second pole tip region of the second pole are included in the method. This method and other alternative methods of the present invention can include one or more planarizations.

With the coil layer recessed into the first pole, a current passed through the coil layer can produce a stronger gap field than in the prior art. Further, when the pole in which the coil layer is embedded is proximate a highly thermally conductive material, for example an undercoat or a substrate wafer, heating of other components by the coil layer can be significantly reduced or substantially eliminated. In particular, when heating of a read sensor connected with the write element is reduced or eliminated, thermal instability and damage to the read sensor can be reduced. Also, when the surface of the write element is substantially planar when the second pole pedestal is formed, the trackwidth can be defined to be about 0.40 microns, which facilitates using the write element in high density applications, such as 35 $Gbit/in^2$.

These and other advantages of the present invention will become apparent to those skilled in the art upon a reading of the following descriptions of the invention and a study of the several figures of the drawing.

BRIEF DESCRIPTION OF THE DRAWINGS

The present invention will be readily understood by the following detailed description in conjunction with the accompanying drawings, and like reference numerals designate like elements.

DETAILED DESCRIPTION OF THE PREFERRED EMBODIMENTS

FIGS. 1A, 1B, 2A, and 2B were discussed with reference to the prior art.

Figure 1A:
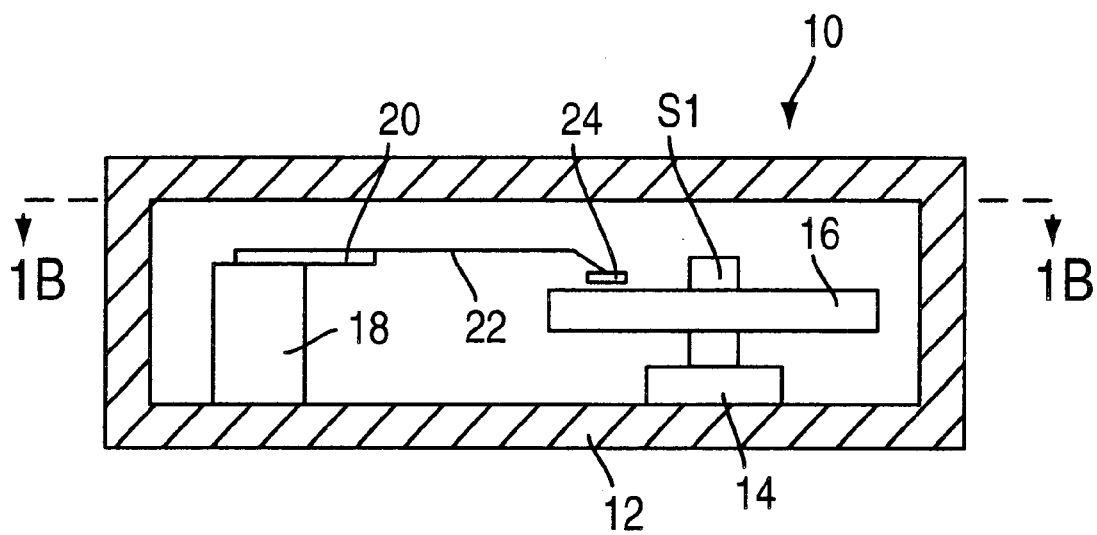
FIG. 1A is a partial cross-sectional elevation view of a magnetic data storage system.
Figure 1B:
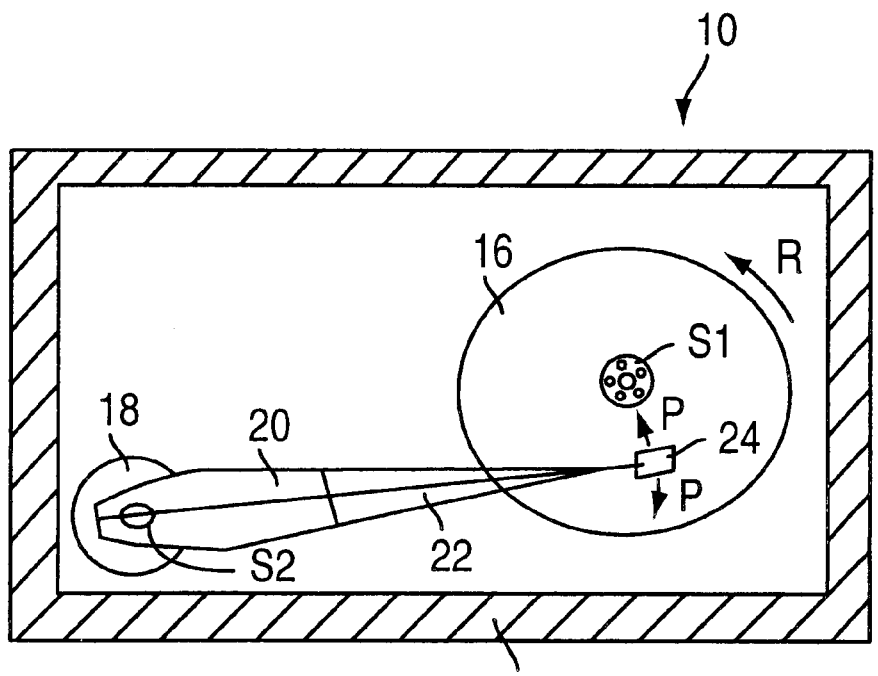
FIG. 1B is a top plan view along line 1B—1B of FIG. 1A.
Figure 2A:
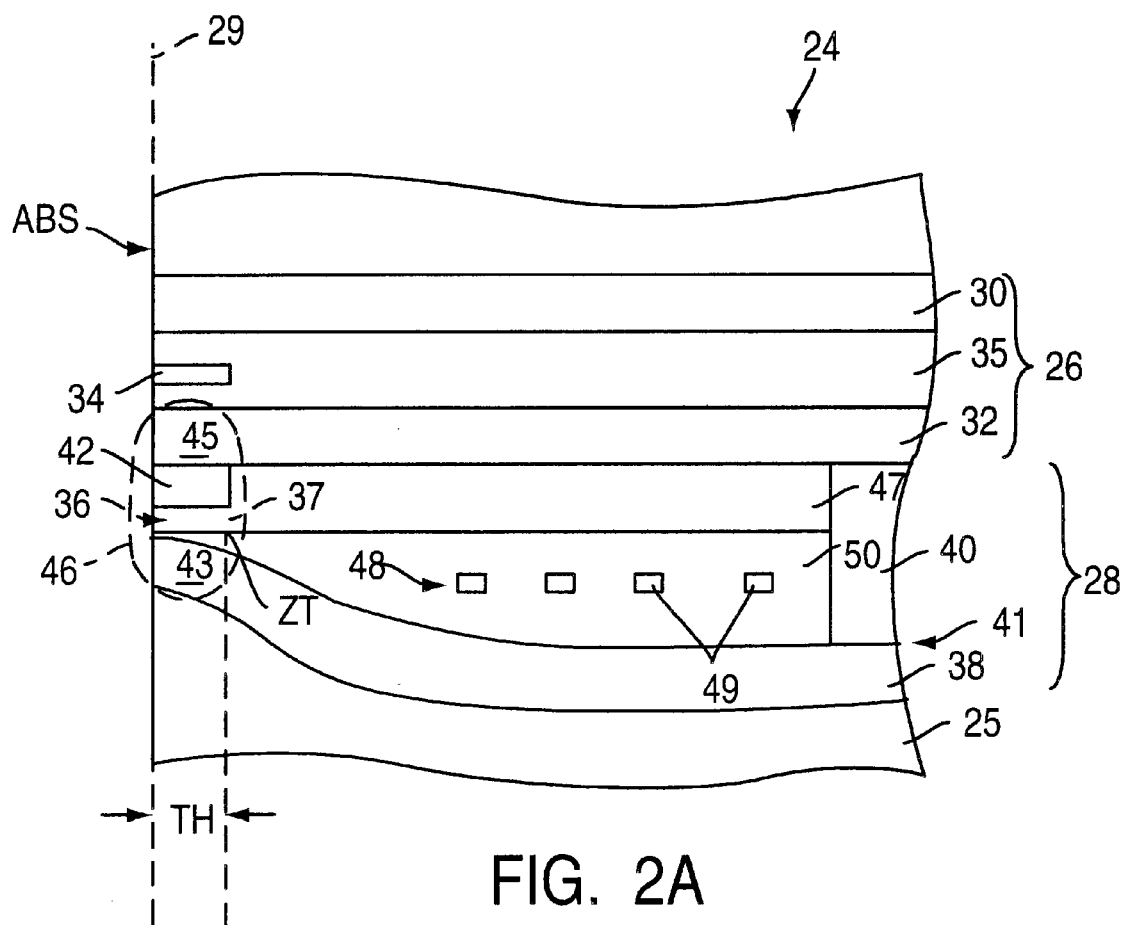
FIG. 2A is a cross-sectional view of a read/write head according to the prior art.
Figure 2B:
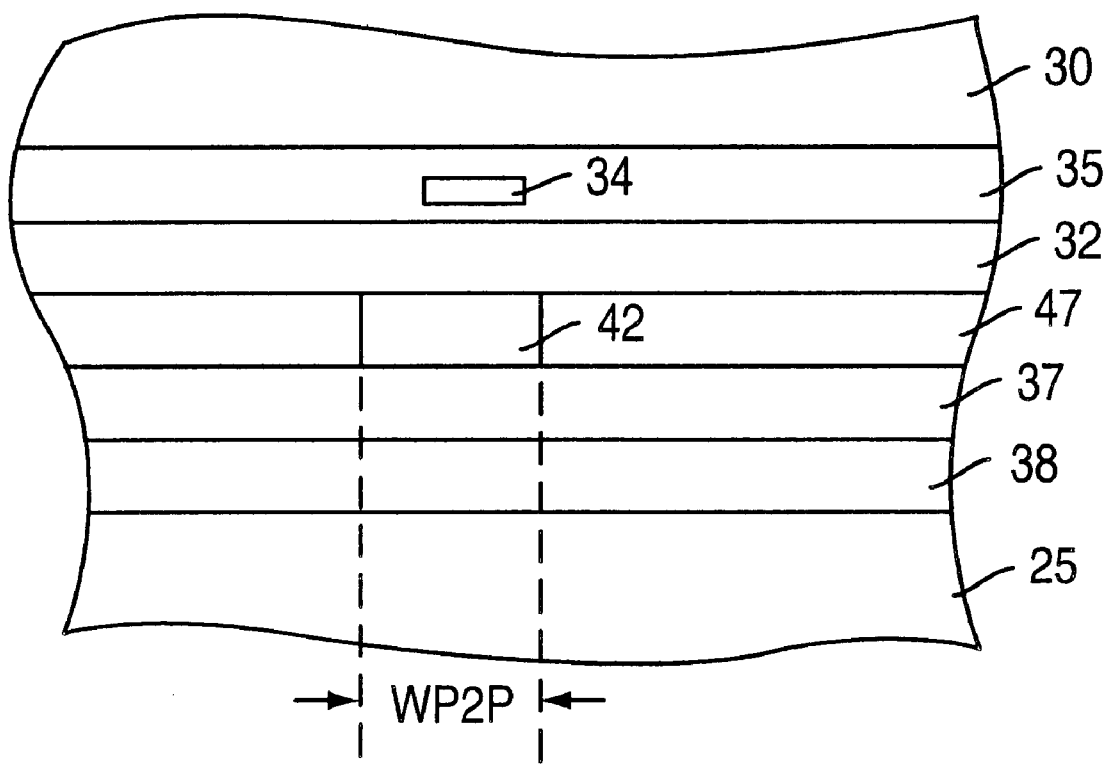
FIG. 2B is an ABS view of the read/write head of FIG. 2A.
Figure 3:
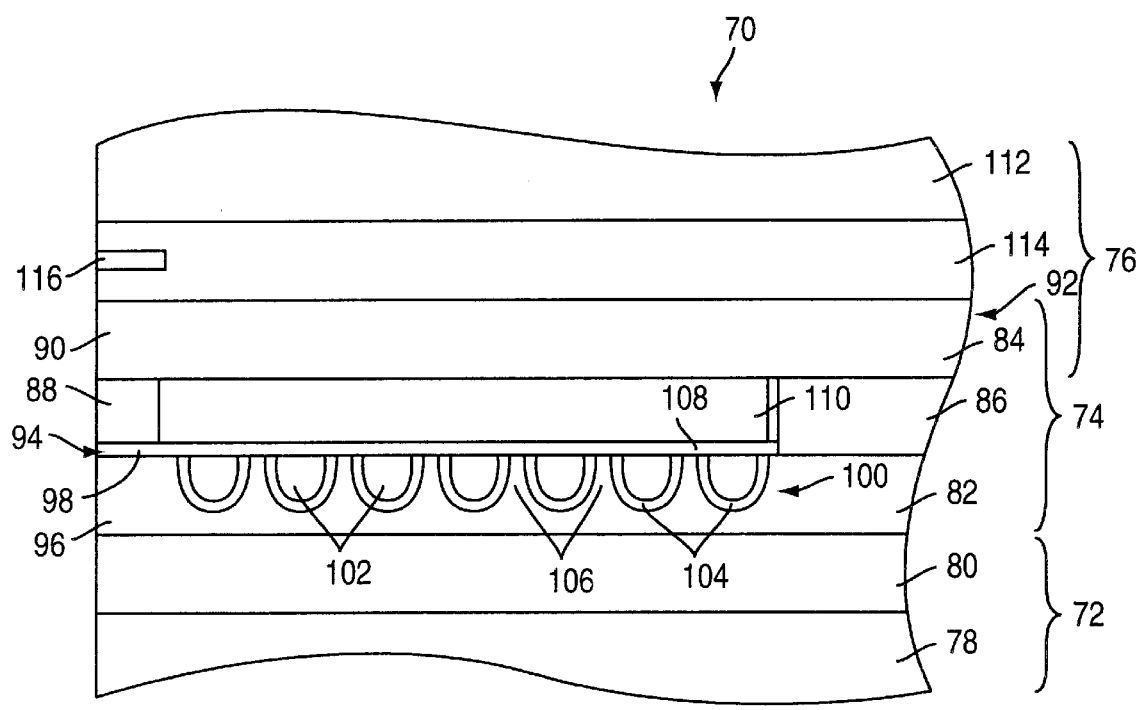
FIG. 3 is a cross-sectional side view of a read/write head, according to an embodiment of the present invention.

FIG. 3 is. a cross-sectional side view of a read/write head 70, according to an embodiment of the present invention. The read/write head 70 includes a substrate 72 above which a write element 74 and a read element 76 are disposed.

The substrate 72 can include a wafer 78, formed of a non-magnetic material such as silicon. In addition, the substrate 72 can also include an undercoat 80 formed above the wafer 78. The undercoat 80 can be formed of any suitable non-magnetic electrically insulating material, such as alumina. In addition, the undercoat 80 also can be formed of a highly thermally conductive material, such as AlN. As discussed further below with respect to the write element 74, use of such materials can be advantageous. While the undercoat 80 can be formed of a single layer, it can alternatively be formed of more than one layer.

The write element 74 includes a first pole 82 and a second pole 84 that are magnetically connected by a backgap portion 86. As shown in FIG. 3, the first pole 82 is disposed above the undercoat 80, and the second pole 84 is disposed above the first pole 82. In addition, a second pole pedestal 88 is connected to a second pole tip portion 90 of the second pole 84. Together, the first pole 82, second pole 84, backgap portion 86 and second pole pedestal 88 form a yoke 92. A write gap 94 is defined between a first pole tip portion 96 of the first pole 82 and the second pole pedestal 88. While the yoke 92 can be formed of a ferromagnetic material, such as a NiFe alloy, the write gap 94 can be filled with a write gap layer 98 that is formed of a non-magnetic, electrically insulating material, for example alumina. The materials of the yoke 92, and the distance between the first pole tip portion and the second pole pedestal 88, are chosen such that the yoke 92 forms a desired gap field at the write gap 94, in response to an applied current, as will be discussed below.

A coil layer 100 is interposed between the first pole 82 and the second pole 84. The coil layer 100 is formed of a highly conductive material, such as copper, and is electrically insulated from the yoke 92. As a current is passed through the coil layer 100, the yoke 92 operates to form a gap field at the write gap 94, as is well known in the art. The coil layer 100 includes at least one coil turn 102, with seven coil turns 102 shown in FIG. 3. While each coil turn 102 is longitudinally connected to the other coil turns 102, for example in series, each coil turn 102 is electrically insulated from transversely adjacent coil turns 102. More specifically, each coil turn 102 of the coil layer 100 is at least partially surrounded by a coil insulation layer 104. In addition, each coil turn 102 is separated from an adjacent coil turn 102 by a coil turn divider 106. Both the coil insulation layer 104 and the coil turn divider 106 are formed of electrically insulating material. The coil insulation layer 104 can be formed of any suitable material such as silicon dioxide ($SiO_2$) or alumina ($Al_2O_3$). In addition, the coil turn dividers 106 can also be formed of any suitable insulating material such as silicon dioxide, or, as shown in FIG. 3, can be integral with the first pole 82 and formed of the same ferromagnetic material.

Importantly, as shown in FIG. 3, the coil layer 100 is recessed or embedded in the first pole 82. Because of this recessed configuration, the coil layer 100 can be in closer proximity to any layers that are on the side of the first pole 82 that is substantially opposite the coil layer 100, than in the prior art. For example, in the embodiment depicted in FIG. 3, the coil layer 100 is closer to the undercoat 80 and the wafer 78. Thus, advantageously, heat that is generated when a current is passed through the coil layer 100 can be transferred through the coil insulation layer 104 and first pole 82 to the undercoat 80, and possibly to the wafer 78. In such cases, transfer of the coil layer heat to other elements of the read/write head 70 can be substantially avoided or significantly reduced. The degree of such heat dissipation can be influenced by the conductive properties of the coil layer 100, the coil insulation layer 104, the first pole 82, the undercoat 80, and the wafer 78 with relation to the conductivity properties of other materials in contact with the coil layer 100. For example, the undercoat 80 can be formed of AlN, or any other suitable material that can facilitate transfer of the coil layer heat to the undercoat 80. In this way, the undercoat 80 and possibly the wafer 78 can operate as a heat sink in relation to the coil layer 100.

As a further advantage of the coil layer 100 being recessed into the first pole 82, the increased proximity of the coil layer with the first pole can increase the magnetic gap field of the write element at the write gap 94. Thus, higher coil performance can be achieved without the inclusion of additional coil turns or coil layers. Associated increases in write element stack height or yoke length, and their related performance reductions, are therefore avoided by the recessed configuration.

The coil layer 100 is also electrically insulated from the second pole 84 by a coil separation layer 108. The coil separation layer 108 is formed of an electrically insulating material, such as alumina. As shown in FIG. 3, the coil separation layer 108 can be integral with and therefore formed of the same material as the write gap layer 98. To facilitate disposing the second pole 84 above the second pole pedestal 88 and the backgap portion 86, a buildup insulation layer 110 is disposed above the coil separation layer 108, between the second pole pedestal 88 and the backgap portion 86. The buildup insulation layer 110 can be formed of any suitable non-magnetic, electrically insulating material, such as silicon dioxide or alumina. In addition, the buildup insulation layer 110 can be either integral with or distinct from the coil separation layer 108, and formed of either the same or different materials.

The read element 76 includes a first shield 112 above the second pole 84, which operates as a second shield. Also included in read element 76, is a read gap insulation layer 114 disposed between the first shield 112 and the second shield 84. The read gap insulation layer 114 is formed of any suitable non-magnetic material such as alumina. Embedded in the read gap insulation layer 114 is a read sensor 116. The read sensor 116 is magnetically insulated from the first shield 112 and the second shield 84, and is aligned with the first pole tip portion 96, the write gap 94, the second pole pedestal 88, and the second pole tip portion 90. The read sensor 116 can be any suitable read sensor, such as a magnetoresistive sensor, for example an AMR or GMR sensor. The wafer 78, undercoat 80, first pole 82, write gap layer 98, second pole pedestal 88, second pole 84, read gap insulation layer 114, read sensor 116 and first shield 112 each have an edge that form an air bearing surface ABS. As is well known to those skilled in the art, the read/write head 70 is positioned above and moved relative to a magnetic medium (see FIGS. 1A, 1B), with the air bearing surface ABS facing the surface of the magnetic medium.

Figure 4:
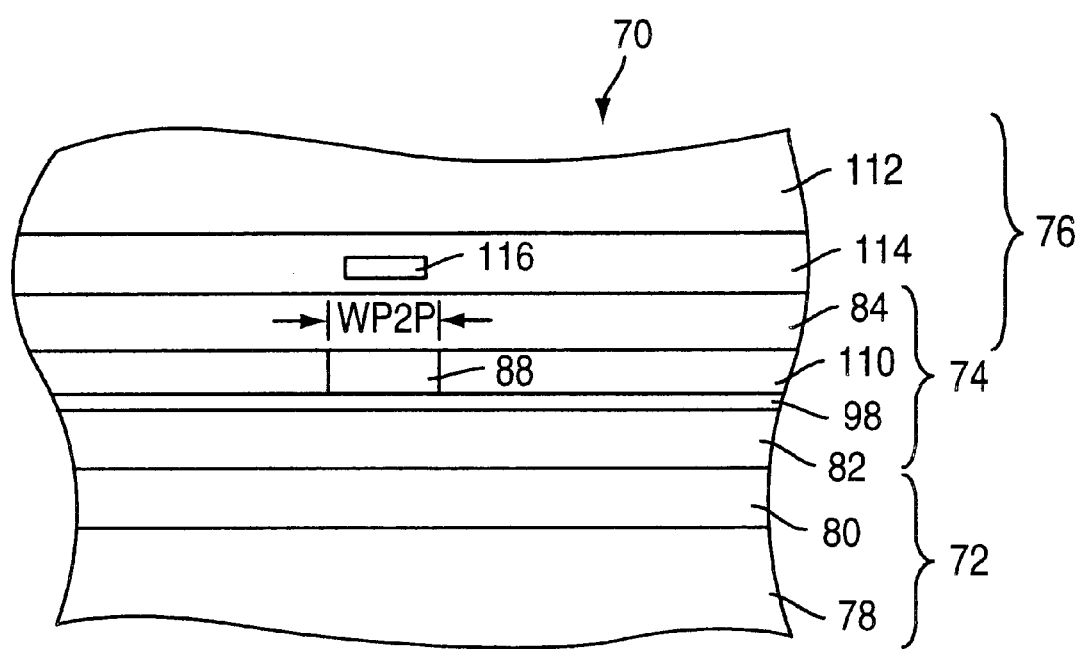
FIG. 4 is an ABS view of a read/write head, according to an embodiment of the present invention.

FIG. 4 depicts an ABS view of the read/write head 70. From this view, the dimensions of the second pole pedestal 88 can be further understood. In particular, the second pole pedestal width WP2P can be seen. The second pole pedestal width WP2P can be the dimension of the write element 74 which substantially defines the track width of the element. Further, it can be better understood from FIG. 4 that the buildup insulation layer 110 extends around the second pole pedestal 88 between the write gap layer 98 and the second pole 84

Figure 5:
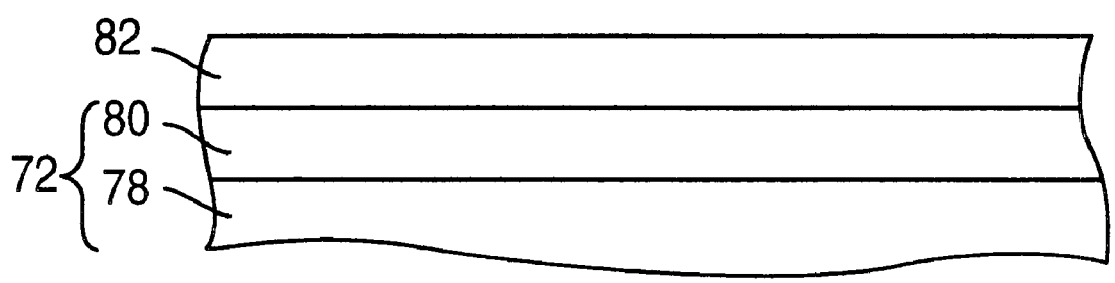
FIGS. 5–12 are cross-sectional views of a read/write head at various stages of fabrication, according to an embodiment of the present invention.

FIGS. 5 through 12 show a read/write head 70 at various stages of a method of fabrication, according to an embodiment of the present invention. As shown in FIG. 5, an undercoat 80 is formed above a wafer 78. The wafer 78 can be formed of any suitable non-magnetic material such as silicon, while the undercoat 80 can be formed of any suitable non-magnetic and electrically insulating material, such as alumina. In addition, in particular embodiments of the present invention, the undercoat 80 can be formed of a highly thermally conductive material, such as AlN. Above the undercoat 80, the first pole 82 is formed of a ferromagnetic material, for example permalloy, or a high magnetization material such as 55% FeNi. This formation can include masking and then plating of the ferromagnetic material, or any other suitable techniques for forming the first pole. The first pole 82 is then substantially planarized, for example by chemical-mechanical polishing (CMP).

Figure 6:
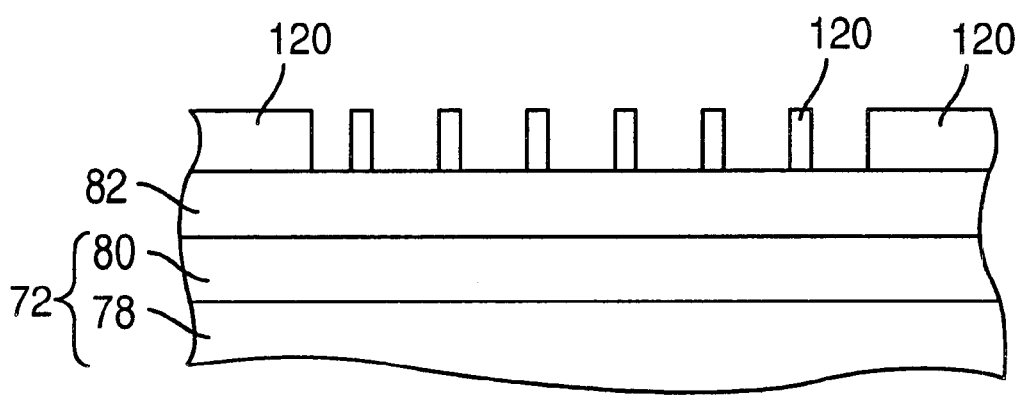
Figure 7:
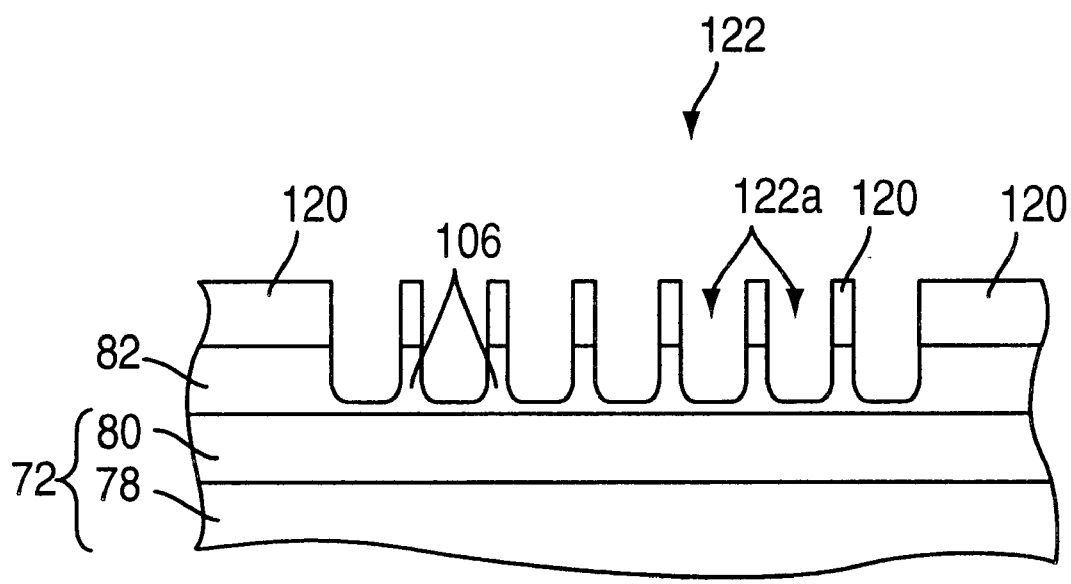

As can be better understood with reference to FIG. 6, a mask 120 that is resistive to etching is formed above the first pole 82. As shown in FIG. 7, the mask 120 and first pole 82 are then subjected to etching to create a coil cavity 122 in the first pole 82. In the embodiment shown in FIG. 7, the coil cavity 122 comprises a plurality of sub-cavities 122a that are configured for receiving individual coil turns 102, as described below with referenced to FIG. 9. The etching process of FIG. 7 can include ion milling or any other suitable method known to those skilled in the art. The depth of the sub-cavities 122a is preferably in the range of ⅓ to ¼ of the thickness of the first pole 82. As the individual coil sub-cavities 122a are formed in the first pole 82, coil turn dividers 106 integral to the first pole 82 can be formed between and defining the coil sub-cavities 122a. After the etching process is completed and the coil cavity 122 has been formed, the resistive mask 120 is removed, for example by stripping.

Figure 18:
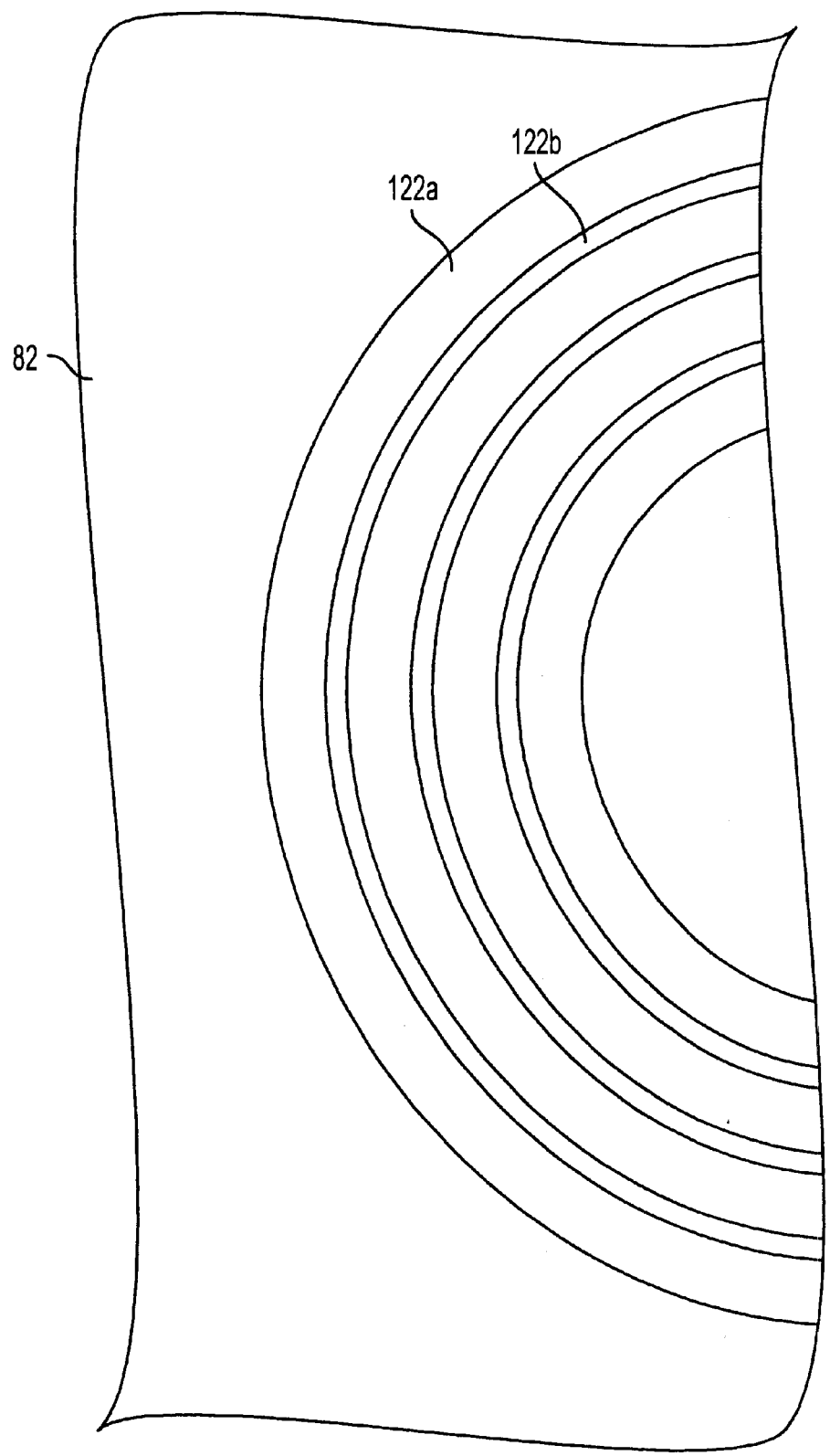
FIG. 18 is a top plan view of a portion of a first pole, according to an embodiment of the present invention.

FIG. 18 is a top plan view of the first pole 82 after the coil cavity 122 has been formed and the resistive mask 120 has been removed. The spiral configuration of sub-cavities 122a and coil turn dividers 122b is shown on a portion of the first pole 82 located between a yoke tip region and a backgap portion.

Figure 8:
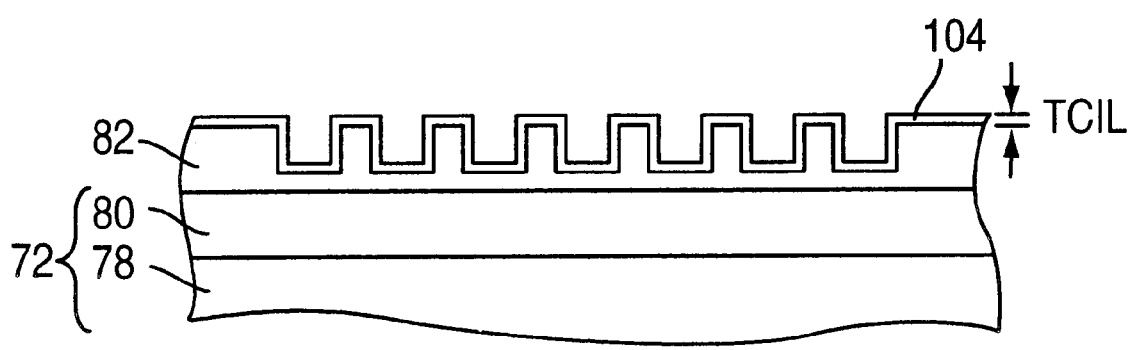

FIG. 8 shows the deposition of the coil insulation layer 104 over the remaining portion of the first pole 82. For example, the coil insulation layer 104 can include silicon dioxide or any other suitable electrically insulating material such as AlN. The material and method of deposition include those that facilitate formation of a relatively thin material lining the coil cavity 122. For example, the coil insulation layer 104 may be deposited by sputtering. Advantageously, silicon dioxide can be deposited without high heat processes. Avoiding high temperatures can be desirable where the read sensor is built first since high temperatures may induce thermal instabilities, for example, in GMR sensors. The thickness TCIL of the coil insulation layer 104 can be greater than 0.1 microns thick, with 0.3 microns working well.

Figure 9:
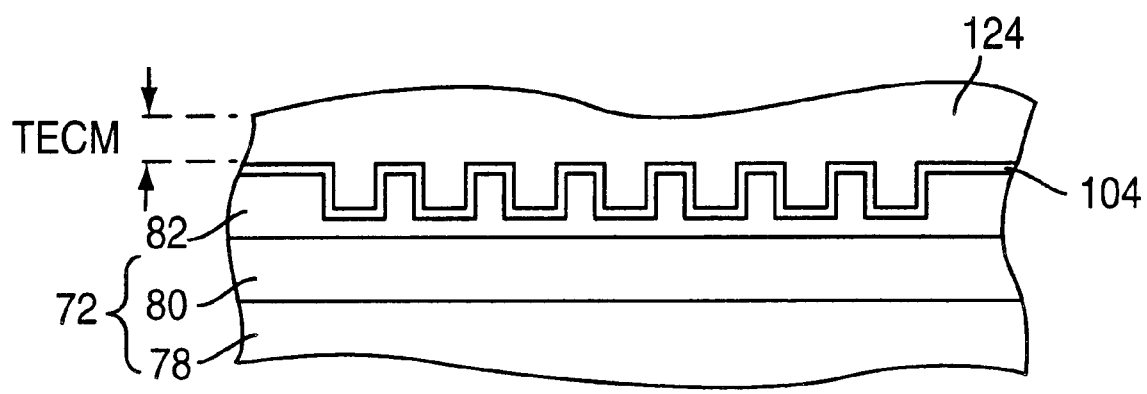
Figure 10:
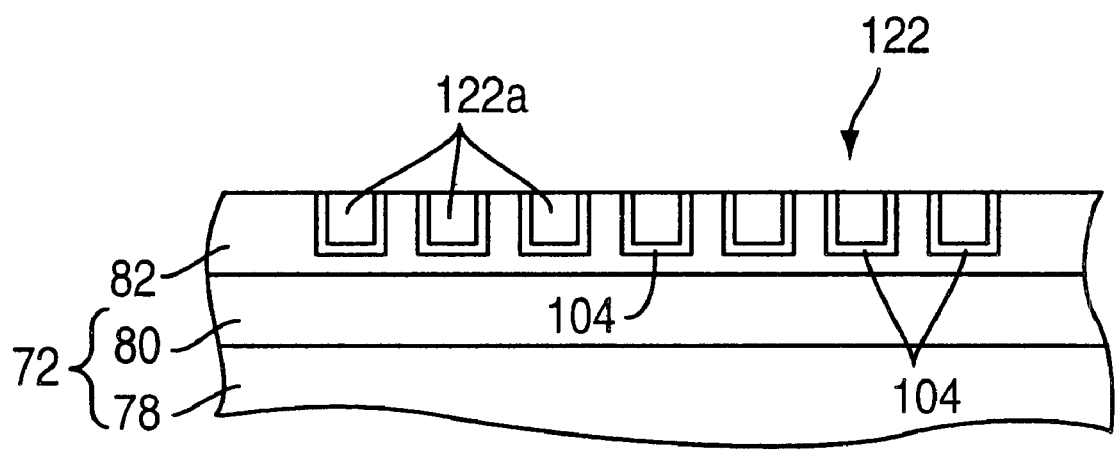

A full film of an electrically conductive material 124 is plated above the coil insulation layer 104 in FIG. 9, including filling the coil cavity 122. The electrically conductive material 124 can be any suitable highly electrically conductive material, for example copper. In addition, the electrically conductive material 124 can be plated to a thickness TECM in the range of about 2.5 microns to about 5 microns, with about 3.2 microns working well. FIG. 10 depicts the planarization of the first pole 82, the coil insulation layer 104, and the electrically conductive material 124. For example, the planarization can be performed with a chemical-mechanical polish (CMP) technique. As is discussed further below with reference to FIG. 11, this planarization can facilitate the formation of the successive layers. This planarization also breaks up the continuity of the coil insulation layer 104 so that it is no longer a continuous thin film but is instead composed of a plurality of discrete segments. Nevertheless, for the purposes of this discussion coil insulation layer 104 will continue to be considered as a single layer after planarization.

At the completion of the planarization, a coil layer 100 is defined. In particular, the coil layer 100 is formed of a plurality of coil turns 102 that are physically and electrically separated from each other by coil turn dividers 106 and the coil insulation layer 104. Further, the coil insulation layer 104 electrically insulates the coil layer 100 from the first pole 82.

Figure 11:
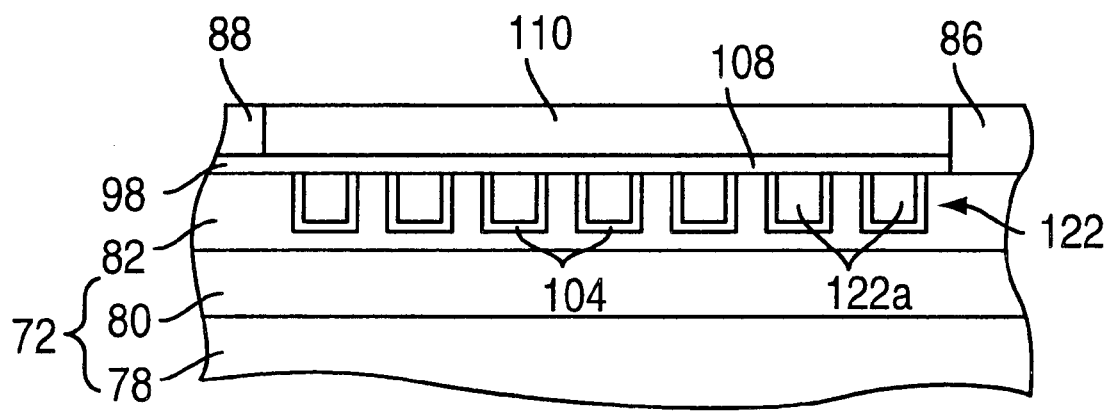

Depicted in FIG. 11, the write gap layer 98 and coil separation layer 108 are formed above the first pole 82, the coil insulation layer 104, the coil turn dividers 106, and the coil layer 100. In addition, the backgap portion 86 is formed above and in magnetic connection with the first pole 82. The second pole pedestal 88 is formed distal the backgap portion 86, and aligned with a first pole tip portion 96 of the first pole 82. However, the second pole pedestal 88 is separated from and magnetically insulated from the first pole 82 by the write gap layer 98. Also shown in FIG. 11, the buildup insulation layer 110 is formed above the coil separation layer 108, between the second pole pedestal 88 and the backgap portion 86. Because the first pole 82, the coil insulation layer 104, the coil turn dividers 106, and the coil layer 100 have been substantially planarized, the second pole pedestal 88 is formed over substantially zero topography.

The structures shown in FIG. 11 can be formed in a variety of suitable methods. For example, a photoresistive mask can be formed above the first pole 82, including covering a portion of the first pole 82 that is distal the first pole tip portion 96. A single layer of nonmagnetic, electrically insulating material can then be deposited over the mask, and the mask then removed, thereby forming the write gap layer 98 and the coil separation layer 108 integral with each other. With the removal of the mask, the first pole 82 is exposed distal the first pole tip portion 96. A photoresistive mask and plating can then be used to form the second pole pedestal 88 and the backgap portion 86. Because the first pole 82, the coil insulation layer 104, the coil turn dividers 106, and the coil layer 100 have been substantially planarized, the second pole pedestal 88 is formed over substantially zero topography. Thus, this masking and plating can be significantly controlled with small dimensions. For example, the width Wp2p (see FIG. 4) can be defined to be less than about one micron, with about 0.4 microns working well for applications such as 35 Gbit/in$^2$.

A non-magnetic,. electrically insulating material can then be deposited above the second pole pedestal 88, the coil separation layer 108, and the backgap portion 86. This insulation material can be substantially planarized to form the buildup insulation layer 110. This same planarization process can also be used to expose and substantially planarize the second pole pedestal 88 and the backgap portion 86, substantially coplanar with the buildup insulation layer 110.

Figure 12:
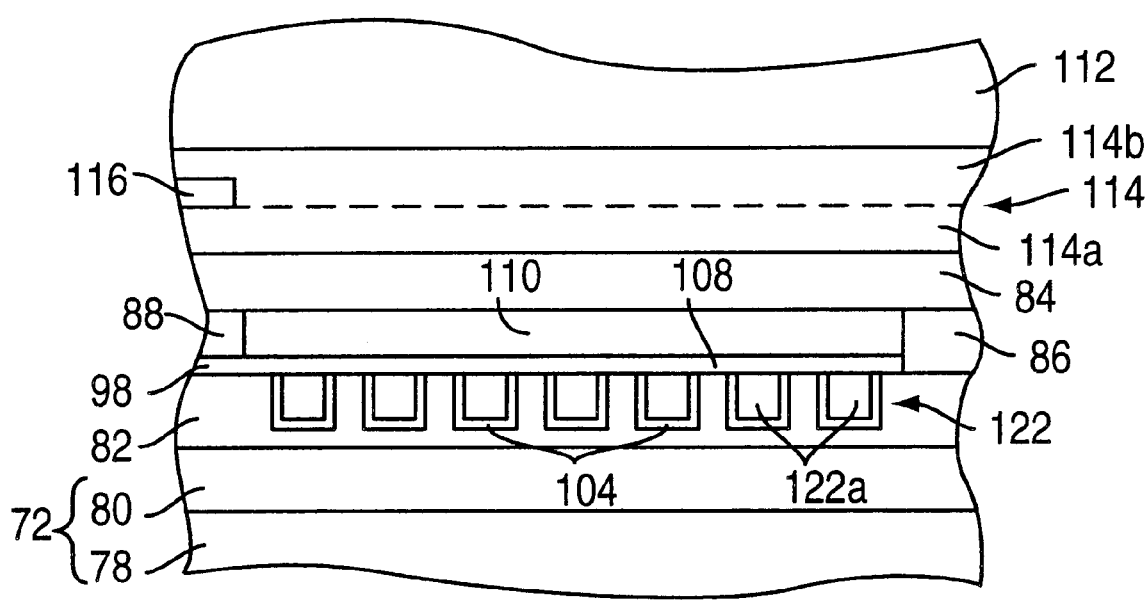

The second pole 84, shown in FIG. 12, is formed above the second pole pedestal 88, the buildup insulation layer 110, and backgap portion 86. The second pole 84 can be formed of any suitable magnetic material, such as permalloy, that is magnetically connected with the backgap portion 86 and the second pole pedestal 88. A variety of methods can be used to form the second pole 84, including forming a mask, plating ferromagnetic material, and then removing the mask. For example, the mask can be formed of photoresistive material that is removed by stripping. Advantageously, because the second pole pedestal 88, the buildup insulation layer 110, and backgap portion 86 are substantially planarized, the definition of the physical dimensions of the second pole 84 is easier and more precise. Additionally, the planarization of the second pole pedestal 88 is advantageous because it fosters a very smooth interface between the second pole pedestal 88 and the second pole 84. A smooth interface is desirable because magnetic coupling between the second pole pedestal 88 and the second pole 84 occurs via an exchange interaction that takes place over a short range of about 2–10 nm, and interface roughness can degrade this magnetic interaction. If this magnetic interaction is degraded, an undesirable magnetic saturation at the interface may occur. Further, because the apex angle is substantially zero, the material characteristics of the second pole 84 can be better controlled. The second pole 84 thus forms a yoke 92 with the second pole pedestal 88, the backgap portion 86, and the first pole 82.

In addition, the second pole 84 can operate as a shield of a read element 76, as shown in FIG. 12. The read element 76 is further fabricated by forming a read gap insulation layer 114 above the second pole 84, and a first shield 112 above the read gap insulation layer 114. A read sensor 116 is also formed, separated from the first shield 112 and second pole/second shield 84 by the read gap insulation layer 114. Forming the read gap insulation layer 114 can include depositing a non-magnetic, electrically insulating material over the second pole 84 to form a first read gap layer 114a. A read sensor 116 can then be formed over the nonmagnetic, electrically insulating material. The read sensor 116 can be formed by any suitable method that provides a sensor that is suitable for retrieving data from a magnetic disk. For example, the read sensor 116 can be a magnetoresistive (MR) sensor, and more specifically, can be an AMR or GMR sensor. Subsequently, further non-magnetic, electrically insulating material can be deposited over the read sensor 116 and the first read gap layer 114a, to form a second read gap layer 114b. Of course, other methods and techniques can be additionally or alternatively used to form a read sensor that is electrically and magnetically insulated from the first and second shields 112, 84. The first shield 112 can be formed above the red gap insulation layer 114 through various techniques, including forming a mask, plating, and removing the mask. The first shield 112 can be formed, for example, of a magnetic material such as permalloy.

Figure 13:
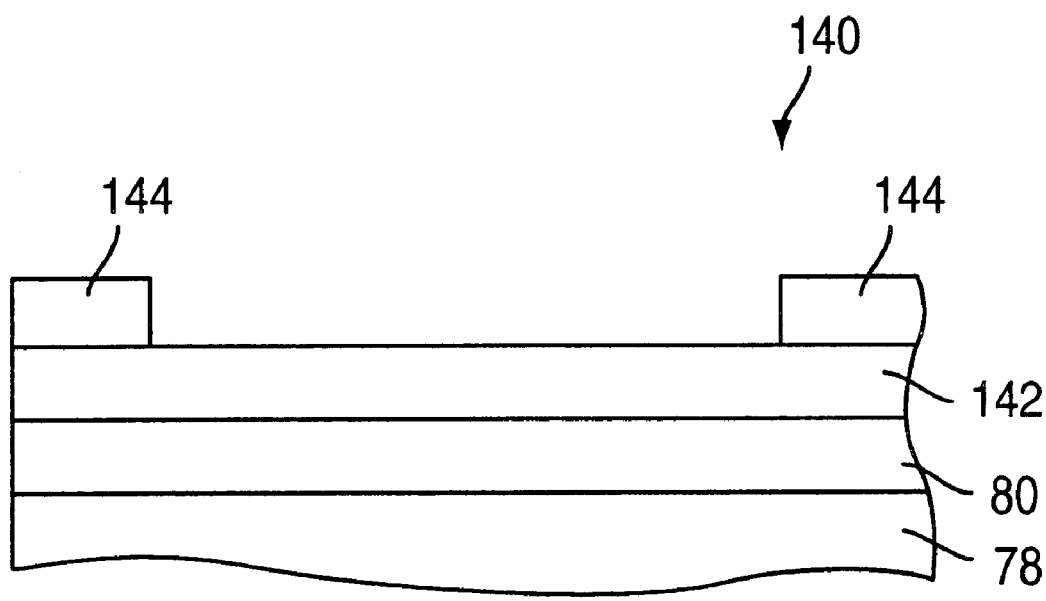
FIGS. 13–17 are cross-section views of a read/write head at various stages of fabrication, according to another embodiment of the present invention.

FIGS. 13 through 17 show a read/write head 140 at various stages of a method of fabrication, according to an embodiment of the present invention. FIG. 13 illustrates that the formation of the read/write head 140 includes the formation of an undercoat 80 above a wafer 78, as with the read/write head 70 of FIG. 6. The wafer 78 can be formed of any suitable non-magnetic material such as silicon, while the undercoat 80 can be formed of any suitable non-magnetic and electrically insulating material, such as $Al_2O_3$. In addition, in particular embodiments of the present invention, the undercoat 80 can be formed of a highly thermally conductive material, such as AlN. Above the undercoat 80, a first pole 142 is formed of ferromagnetic material, for example permalloy. This formation can include masking and then plating of the ferromagnetic material, or any other suitable techniques for forming the first pole 142. The first pole 142 is then substantially planarized, for example by chemical-mechanical polishing (CMP). As can be further seen from FIG. 13, a mask 144, that is resistive to etching, is formed above the first pole 142.

Figure 14:
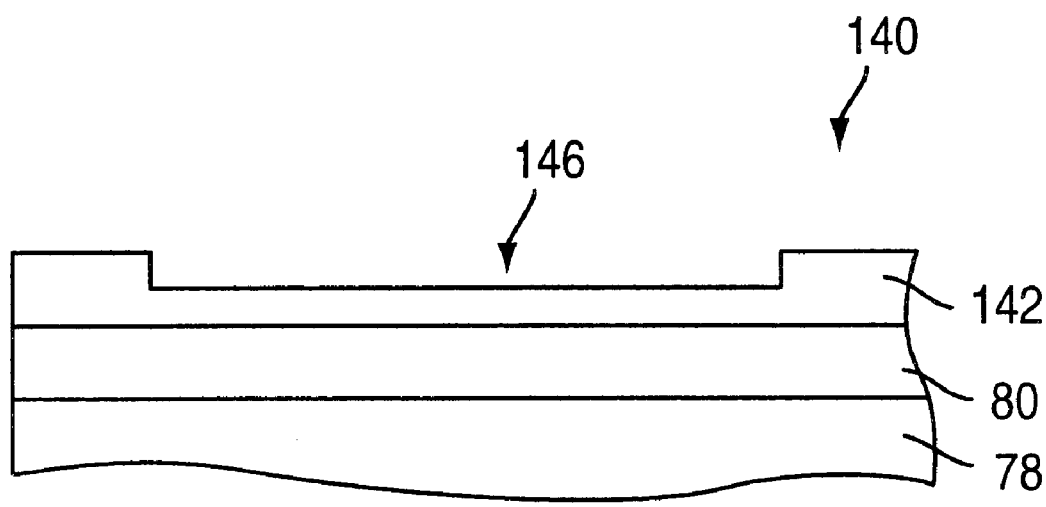

In FIG. 14, the mask 144 and first pole 142 are then subjected to etching to create a coil cavity 146 in the first pole 142. The etching process of FIG. 14 can include ion milling or any other suitable method known to those skilled in the art. After the etching process is completed and the coil cavity 146 has been formed, the resistive mask 144 is removed, for example by stripping. Preferably, this process should produce a coil cavity 146 with a depth in the range of about ¼ to about ⅓ the thickness of the first pole 142.

Figure 15:
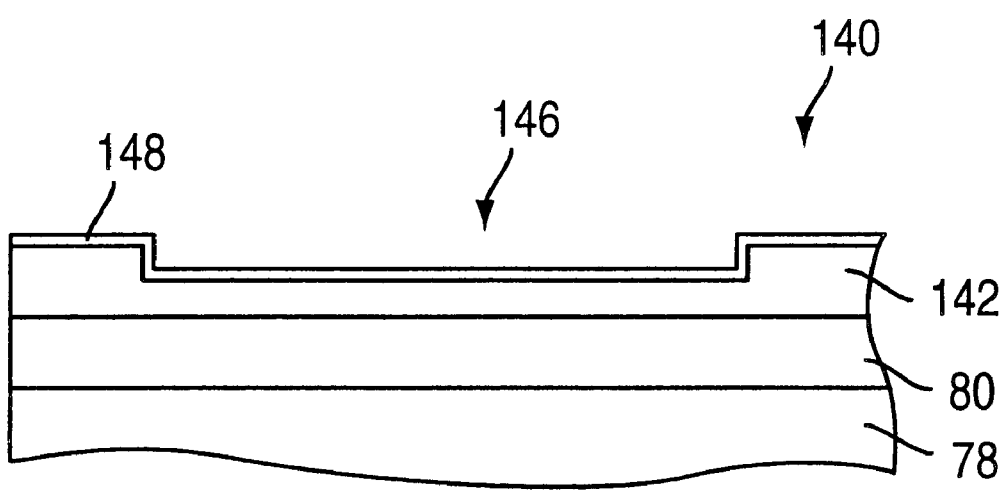

FIG. 15 shows the deposition of the coil insulation layer 148 over the remaining portion of the first pole 142. For example, the coil insulation layer 148 can include silicon dioxide or any other suitable electrically insulating material such as alumina. The material and method of deposition include those that facilitate formation of a relatively thin material lining the coil cavity 146. A sputtering process may be used to deposit the coil insulation layer 148. For example, the thickness TCIL of the coil insulation layer 148 can be greater than 0.1 microns thick, with 0.30 microns working well.

Figure 16:
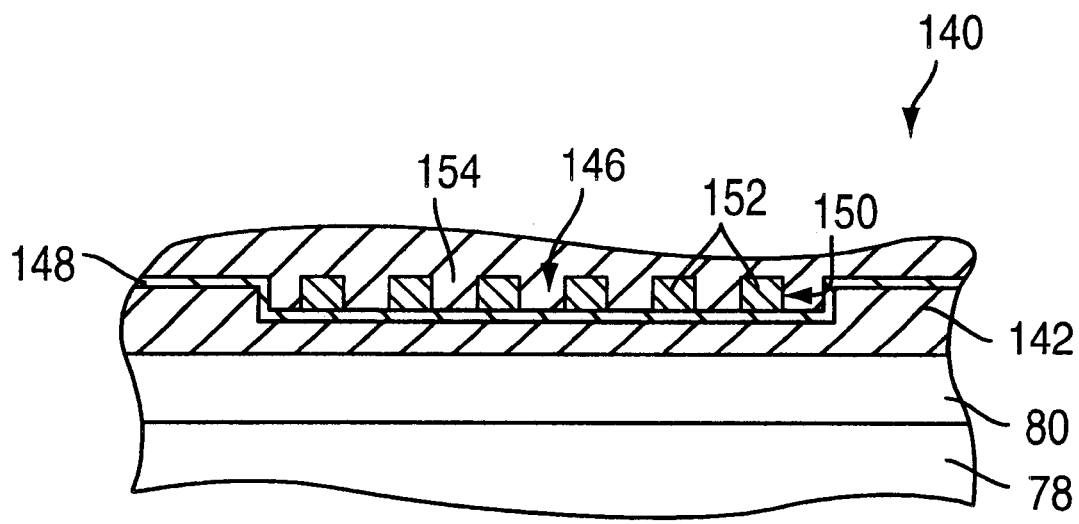

A coil layer 150 is shown formed in FIG. 16 above the coil insulation layer 148. The coil layer 150 can be formed of any suitable highly electrically conductive material, for example copper. Various suitable methods can be performed to form the coil layer 150. For example, in a particular embodiment, a full film of electrically conductive material can be plated above the coil insulation layer 148 shown in FIG. 15, including filling the coil cavity 146. The electrically conductive material can be plated to a thickness, within the coil cavity 146, in the range of about 2.5 microns to about 5 microns, with about 3.2 microns working well. A patterned mask that is resistive to etching can then be formed over the electrically conductive material. With the mask, the electrically conductive material can then be etched using any suitable method for removing portions of the electrically conductive material, for example by ion milling. In an alternative particular embodiment, a patterned mask or plating dam can be formed above the coil insulation layer 148. Electrically conductive material can then be deposited over the patterned mask or plating dam. In either of these two particular embodiments, the mask is then removed, leaving the coil layer 150, including individual coil turns 152. Thus, the coil layer 150 is electrically insulated from the first pole 142 by the coil insulation layer 148. Also, the coil layer 150 is advantageously recessed into the first pole 142. However, the turns 152 need to be transversely electrically insulated from each other. To accomplish such insulation, a full film of non-magnetic, electrically insulating material 154 is formed above the coil layer 150 and the coil insulation layer 148, including between the coil turns 152. This electrically insulating material 154 can include any suitable material that can electrically insulate transversely adjacent coil turns from each other, such as alumina.

Figure 17:
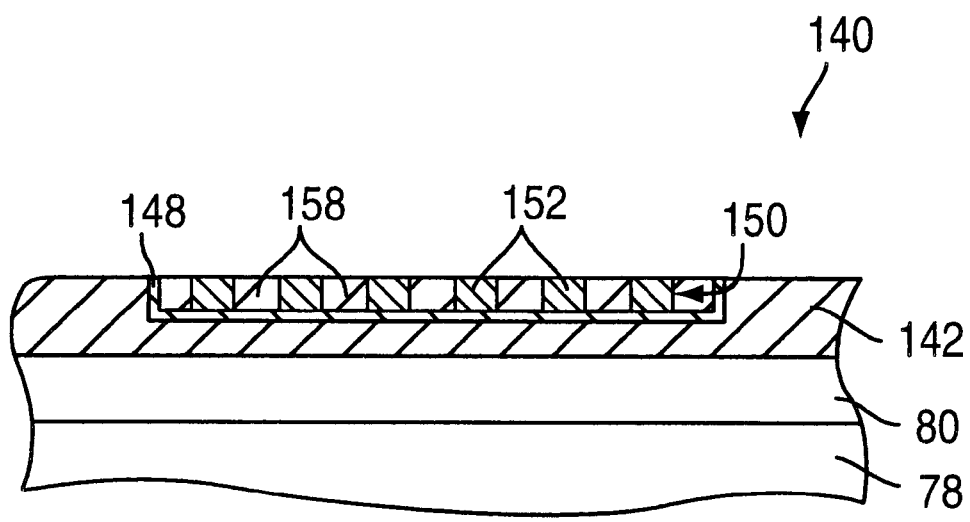

In addition, FIG. 17 depicts the planarization of the coil insulation layer 148 and the electrically insulating material 154. After such planarization, in some embodiments, the coil layer 150 is thereby exposed. In some embodiments, the coil layer 150 can also be planarized, and can be so planarized in substantially the same operation as the planarization of the coil insulation layer 148 and the electrically insulating material 154. For example, the planarization can be performed with a chemical-mechanical polish (CMP) technique. After the planarization, the coil layer 100 is formed of a plurality of coil turns 152 that are physically and electrically separated from each other by coil turn dividers 158. A second pole can then be formed using various techniques, for example those discussed above with reference to FIG. 12. Further, to form a read/write head, a read element can be formed using known techniques, such as those also earlier discussed with reference to FIG. 12. In any embodiment of the present invention, fabrication can further include separating the device, such as the read/write head, from a wafer, for example by cutting a slider bar. Such a slider bar can then be lapped, for example by a CMP process, to form a substantially planar ABS. The lapping can also include a polishing of the slider bar. This lapping can facilitate definition of the write element throat height and the read sensor stripe height. After lapping, the read/write head, or other formed device, can be further separated from the slider bar, for example by cutting. Of course, other methods known to those skilled in the art can also be used to further incorporate the device onto a slider, a head gimbal assembly, or other component.

In summary, the present invention provides structures and methods for providing a magnetic recording device that can be used in high data density applications with improved write performance and reduced thermal impact on an associated magnetic read element. The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. For example, while embodiments of the present invention have been described to include a read element above the write element, alternative embodiments can include the write element of the present invention alone, or with a read element formed below the write element. With appropriate modification, the write element 74 can also include additional coil layers between the first pole and second pole. In addition, the above described write element or read/write head can be incorporated with other components to form a slider, a head gimbal assembly (HGA), or a disk drive system. The embodiments and preferred features described above should be considered exemplary, with the invention being defined by the appended claims, which therefore include all such alternatives, modifications, permutations and equivalents as fall within the true spirit and scope of the present invention.

What is claimed is:

1. A write element for writing data to a magnetic medium comprising:
   a wafer;
   a first pole disposed above said wafer and including a top surface and a spiral cavity;
   a coil formed within said cavity;
   a coil separation layer disposed between said first pole and said coil;
   a second pole disposed above said first pole; and
   a write gap layer, including a bottom surface, disposed between said first pole and said second pole such that said bottom surface of said write gap layer contacts said top surface of said first pole.

2. The write element of claim 1 further comprising an undercoat disposed between said first pole and said wafer.

3. The write element of claim 2 wherein said undercoat comprises more than one layer.

4. The write element of claim 2 wherein said undercoat comprises AlN.

5. The write element of claim 2 wherein said undercoat comprises $Si_3N_4$.

6. The write element of claim 1 further comprising a pole pedestal connected to said second pole and disposed between said second pole and said write gap layer.

7. The write element of claim 6 wherein a trackwidth of said pole pedestal at said air bearing surface is in a range of between about 0.4 and 0.5 microns.

8. The write element of claim 6 wherein a trackwidth of said pole pedestal at said air bearing surface is about 0.4 microns.

9. The write element of claim 6 further comprising a buildup insulation layer disposed between said second pole and said write gap layer.

10. The write element of claim 9 wherein said buildup insulation layer and said write gap layer are integral.

11. A read/write head comprising:
    a write element including
      a wafer;
      a first pole disposed above said wafer and including a top surface and a spiral cavity disposed therein;
      a coil formed within said cavity;
      a coil separation layer disposed between said first pole and said coil;
      a second pole disposed above said first pole; and
      a write gap layer, including a bottom surface, disposed between said first pole and said second pole such that said bottom surface of said write gap layer contacts said top surface of said first pole; and
    a read element disposed above said second pole.

12. The read/write head of claim 11 wherein said read element comprises:
    a read gap insulation layer disposed above said second pole;
    a read sensor embedded within said read gap layer; and
    a shield disposed above said read gap insulation layer.

13. The read/write head of claim 12 wherein said read sensor is a magnetoresistive sensor.

14. The read/write head of claim 13 wherein said magnetoresistive sensor is an AMR sensor.

15. The read/write head of claim 13 wherein said magnetoresistive sensor is a GMR sensor.

16. The read/write head of claim 15 further comprising a pole pedestal connected to said second pole and disposed between said second pole and said write gap layer.

17. The read/write head of claim 16 wherein a trackwidth of said pole pedestal at said air bearing surface is in a range of between about 0.4 and 0.5 microns.

18. The read/write head of claim 16 wherein a trackwidth of said pole pedestal at said air bearing surface is about 0.4 microns.

19. The read/write head of claim 16 further comprising a buildup insulation layer disposed between said second pole and said write gap layer.

20. The read/write head of claim 11 further comprising an undercoat disposed between said first pole and said wafer.

21. The read/write head of claim 20 wherein said undercoat comprises more than one layer.

22. The read/write head of claim 20 wherein said undercoat comprises AlN.

23. The read/write head of claim 20 wherein said undercoat comprises $Si_3N_4$.

24. A write element for writing data to a magnetic medium comprising:
    a first pole including a spiral turn divider;
    a coil recessed within the first pole and including coil turns defined by the spiral turn divider;
    a coil separation layer disposed between the first pole and the coil;
    a second pole disposed above the first pole; and
    a write gap layer disposed between the first pole and the second pole.

25. The write element of claim 24 wherein the first pole has a thickness and the coil has a depth in the range of $\frac{1}{3}$ to $\frac{1}{4}$ of the thickness.

26. The write element of claim 24 wherein the coil separation layer has a thickness greater than 0.1 microns.

27. The write element of claim 24 wherein the coil separation layer has a thickness of 0.3 microns.

* * * * *